Sept. 27, 1960     J. N. DEW ET AL     2,954,218

IN SITU ROASTING AND LEACHING OF URANIUM ORES

Filed Dec. 17, 1956

INVENTOR.
JOHN N. DEW &
WILLIAM L. MARTIN
BY *Jerry J. Dunlap*
ATTORNEY

United States Patent Office 2,954,218
Patented Sept. 27, 1960

2,954,218

IN SITU ROASTING AND LEACHING OF URANIUM ORES

John N. Dew and William L. Martin, Ponca City, Okla., assignors to Continental Oil Company, Ponca City, Okla., a corporation of Delaware Filed Dec. 17, 1956, Ser. No. 628,850

12 Claims. (Cl. 262—3)

This invention relates to a method of recovering soluble minerals, such as uranium, vanadium, and radium, from subsurface ore bodies.

At the present time the recovery of uranium involves, in the main, the physical removal of a uranium-bearing ore from a mine and then leaching of the uranium mineral from the ore. The leaching operation ordinarily requires extensive grinding or crushing of the ore to facilitate the solubilization of uranium from the ore body. The solvent used for leaching may be either an acid or a carbonate leaching solution. Uranium is in turn extracted from the leaching solution by any of several methods, such as: (*a*) adjusting the pH of the solution to neutrality or to strongly basic values, (*b*) concentrating the uranium by ion exchange technique, or (*c*) concentrating the uranium by liquid-liquid extraction.

In some ores much of the uranium is chemically combined with carbon or carbonaceous material, and neither an acid nor a sodium carbonate leach will break down the combination. Also, the carbonaceous material fouls carbonate solutions. It is therefore a common practice to burn off the carbon by roasting or baking the ore at 800 to 900° F., this temperature range providing optimum uranium recovery. It has been found desirable to reduce the carbon content of the ores to at least 0.2 percent by weight. The uranium remains in the ash and is released in the usual manner. Other benefits resulting from baking or roasting the ore include converting vanadium minerals, which are frequently present in significant quantities with the uranium, to more soluble compounds; and the formation of a porous calcine which promotes extraction.

The present invention contemplates a novel method of recovering minerals such as uranium without the necessity of removing the mother ore from its normal position in the earth. Broadly stated, the present invention may be defined as a method of recovering soluble minerals such as uranium from a subsurface, carbonaceous, mineral-bearing ore, comprising the steps of:

(*a*) burning at least a portion of the carbonaceous material in the ore in situ, and then
(*b*) leaching minerals from the ore in situ.

An important object of this invention is to provide an economical process for recovering minerals such as uranium, vanadium, and radium from an ore body containing such minerals.

Another object of this invention is to recover such minerals from an ore without the necessity of removing the ore from its position in the earth.

A further object of this invention is to provide a novel method of recovering uranium and other soluble minerals by solvent extraction.

A still further object of this invention is to enhance the recovery of vanadium from an ore containing little or no carbonaceous materials.

Other objects and advantages of the invention will be evident from the following detailed description, when read in conjunction with the accompanying drawings, which illustrate our invention.

Figure 1:
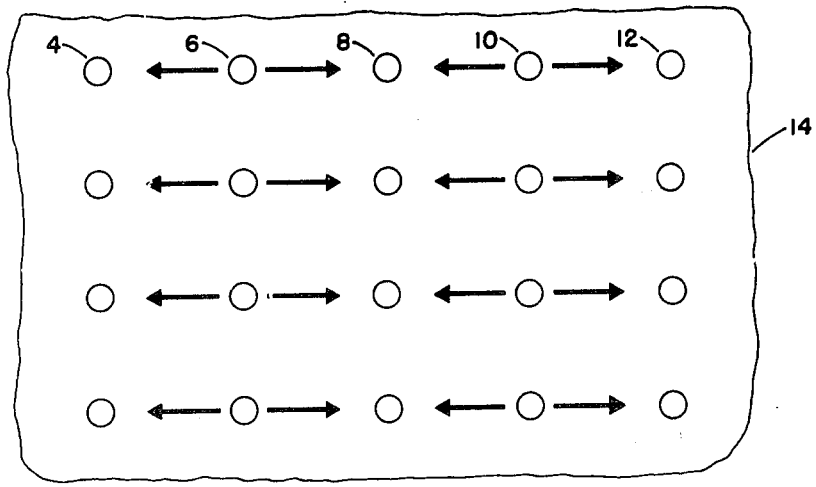
Figure 1 is a schematic representation of an arrangement of wells suitable for practicing the present invention.

As previously indicated, the present method involves the two principal steps of burning carbonaceous material from an ore body containing uranium and other soluble minerals, and then leaching the minerals from the ore body. To perform these burning and leaching steps in situ, we provide a series of spaced wells extending downwardly from the surface to, and preferably through, the mineral-bearing ore body. In Figure 1 we have shown an arrangement of wells which may be preferred when the ore body has a substantially rectangular configuration as viewed in plan. We provide several rows of wells, 4, 6, 8, 10, and 12, with each row extending transversely across the ore body 14. Each of the wells shown in Figure 1 extends from the surface down to or through the mineral-bearing ore body, and the wells in each row are preferably more closely spaced than the spacing between the rows. With this arrangement of wells, the wells in rows 6 and 10 may be conveniently used as injection wells; and the wells in alternate rows, 4, 8, and 12, may be used as recovery wells.

A large portion of the ores which contain uranium also contain a substantial amount of carbon with at least a portion of the carbon chemically combined with the uranium. Examples of such ores are carbonaceous shale, asphaltic sandstones, uraniferous lignite, and subbituminous coals. When the ore body does contain carbon, the ore body around each of the injection wells is first heated to the combustion temperature of the carbon. Suitable means of heating the ore body around these injection wells include gas heaters, such as shown at 16, in Figure 2, as well as electric heaters, hot air, or any other source of thermal energy. When using a gas heater 16, the heater is lowered into the respective well on the lower end of a tubing 18 to a position opposite the ore body 14. The heater is then placed in operation and heats the ore body either by radiation or conduction of heated gas into the ore body. We have found that the temperature of the ore body in the immediate vicinity of each injection well should be raised to about 600° F.

Figure 2:
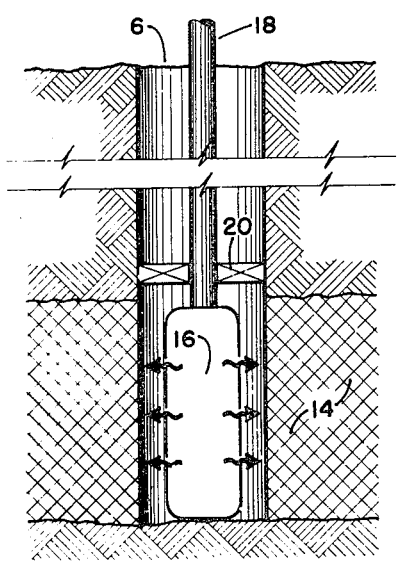
Figure 2 is a schematic cross-sectional view of a well bore illustrating an initial step in the present process.

When the temperature of the ore body 14 has been raised to the desired level, either pure oxygen or an oxygen-containing gas is forced into the ore body through each of the injection wells. This gas can readily be air and can be forced into the ore body 14 in any desired manner. For example, a packer 20 may be secured on the tubing 18, as shown in Figure 2, and the air forced downwardly through or around the heater 16 into the ore body 14. When air is used as the oxygen-containing gas, it should be forced into the ore body 14 at a rate of at least 4 standard cubic feet (s.c.f.) per hour per square foot of area at the flame front normal to the direction of air flow. This rate may be increased up to about 100 s.c.f. per hour per square foot if desired, and if sufficient compressor capacity is available. The optimum air flux is from 20 to 40 s.c.f. per hour per square foot of frontal area normal to the direction of air flow. When pure oxygen is injected, it should be supplied at a minimum rate of 1 s.c.f. per hour per square foot of frontal area normal to the direction of gas flow.

When the air is injected into the ore body 14 at a rate of at least 4 s.c.f. per hour per square foot, the oxygen in the air supports combustion of the carbonaceous material of the ore body 14; and the flame front is forced outwardly from each injection well toward adjacent recovery wells. When the injection wells are closely spaced relative to the spacing between each injection well and the adjacent recovery wells, the pressure drop between adjacent injection wells is retained at a minimum to provide an efficient propagation of the flame front toward the adjacent recovery wells.

Burning of the carbonaceous material in the ore body 14 breaks down the chemical combination of the uranium and carbon, and converts the vanadium and radium content of the ore body into soluble forms. Burning of the carbonaceous content of the ore body 14 also increases the permeability of the ore body to facilitate a subsequent leaching operation. It is preferred that the flame front initiated at each injection well be forced through the ore body 14 to adjacent recovery wells by the continued injection of an oxygen-containing gas, with the oxygen-free gases resulting from the combustion process being vented through the recovery wells; however it is not necessary that the entire ore body 14 be subjected to the burning operation. Hot gases resulting from the combustion of the carbon content of the ore body 14 will be forced through the unburned portions of the ore body to heat up the ore and facilitate subsequent removal of the minerals therefrom.

Figure 3:
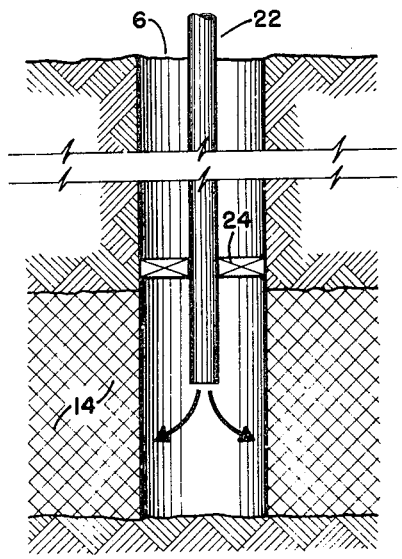
Figure 3 is another schematic sectional view of a well bore illustrating a later step in the present process.

When the desired amount of the carbonaceous material in the ore body 14 has been burned, a suitable solvent is injected through each of the injection wells to leach the mineral content from the ore body. This solvent solution may be introduced into the ore body 14 in any suitable manner, such as through a tubing 22 (Figure 3), extending from the surface to a point opposite the ore body 14 in each injection well. A suitable packer 24 may be secured on each tubing 22 to engage the walls of the respective well bore above the ore body 14 to insure injection of the solvent at the desired zone.

Suitable solvents include aqueous solutions of strong acids, such as HCl, $H_2SO_4$, $HNO_3$, etc. The acid selected should be used in an amount sufficient to provide a pH for the solution of about 0.1 to 1.5. The amount of solvent required will depend upon the well pattern being used for the leaching operation and the amount of acid which will be consumed by the ore, but an amount equal to one pore volume of the entire ore body 14 should be sufficient in all normal cases. In the event the ore body 14 is high in lime content, we prefer to use an aqueous sodium carbonate solution, since the lime consumes large amounts of acid and would ordinarily make the use of acids economically unfeasible. The sodium carbonate may be used in concentrations from 2½ percent to 10 percent, with about 1 percent to 2½ percent sodium bicarbonate added to prevent precipitation of the biuranate from solutions containing OH ions.

The solvent injected in each injection well is forced through the ore body 14 toward adjacent recovery wells, such as wells 4, 8, and 12, where the solution accumulates and may be removed by any suitable lifting operation. The solvent quenches the roast of the ore body 14 and in turn acts as a hot leach. If desired, air may be injected with the solvent to facilitate the leaching process. The continued injection of air with the solvent serves to oxidize any unoxidized uranium in the ore body and decreases the amount of solvent required to leach the ore. The injection of air with the solvent will also facilitate removal of the solvent from the recovery wells. In some instances, sufficient air may be injected with the solvent to provide an air or gas lift of the solvent from the recovery wells to eliminate the necessity of a separate lifting mechanism. The solvent may be followed by the injection of water through the injection wells to completely remove the pregnant solvent from the ore body 14, and provide an economical recovery operation.

The pregnant or concentrated solvent from each recovery well is subjected to an extraction or concentration method, such as those previously described, to remove uranium and other solubilized minerals from the solvent. The removal of the minerals from the concentrated solvent forms no part of the present invention and therefore is not described in detail herein. As previously stated, this removal may be obtained by any of the several methods known in the art.

Where the vanadium content of an ore is sufficiently high, or the refractory characteristics of the ore make a roast desirable, and the carbon content is not sufficiently high to permit a roasting operation as described above, we contemplate injecting a carbon-containing material into the ore body. For example, we may inject a crude petroleum or solvent-cut residuum into the ore body 14 through each injection well. Sufficient petroleum should be injected to provide about 1.5 percent carbon deposit in the ore body through that portion of the ore subjected to burning. The injection procedure could readily be performed by the use of a tubing 22 and packer 24 in the manner illustrated in Figure 3. The petroleum is forced downwardly through the tubing 22 under sufficient pressure to enter and flow through the ore body 14 to the desired extent. It is not necessary, however, that sufficient crude be injected to impregnate the entire ore body 14. It has been determined experimentally that a quantity of oil calculated to provide the amount of heat required can be injected into a core of sandstone, ignited, and the heat wave driven through the core by a self-sustained combustion wave. In this experiment crude oil in the amount of 20 percent of the pore volume of a core was measured into the top of a tube containing the dry core. The oil was pushed into the core by means of air pressure and then ignited by means of an external heater at the top of the tube. The combustion front thus initiated was maintained and moved through the entire length of the core by continued air injection, as evidenced by an analysis of exit gases from the core and temperature measurements obtained by means of thermocouple wells embedded in the core.

The amount of oil to be injected may be calculated from the heat capacity of the ore body and the heat of the combustion of the hydrocarbon injected into the ore. Approximately one pound of hydrocarbon is required to heat each 100 pounds of ore to 800° F. When working with ores having porosities between 20 and 30 percent, we prefer to use a quantity of hydrocarbon amounting to from 10 to 20 percent of the pore volume of the portion of the ore body being roasted. As previously stated, the entire ore body 14 may be subjected to the combustion operation; however an alternate operating scheme is to inject sufficient hydrocarbon to heat up, by in situ combustion, approximately 50 percent of the ore body. The heat wave produced by burning the hydrocarbon may then be moved through the remainder of the ore body by conduction and/or convective heat transfer between the solid and recycled combustion gases.

The injected hydrocarbon is ignited and the flame front propagated through the ore body 14 in the same manner as previously described, and then the roasting step is followed by the leaching operation in the same manner as previously described.

We also contemplate the propagation of a flame front through the ore body by the injection of a combustible mixture of oxygen, inert gas, and hydrocarbon gases through the injection wells, with a subsequent heating of the ore body around the injection well and further injection of the combustible mixture. The flame front may be forced through the ore body from each injection well toward the adjacent recovery wells by injecting the combustible mixture at a sufficient rate to prevent burn-back to the injection wells. Intermittently, a slug of inert gas may be injected in lieu of the combustible mixture to force the flame front outwardly from each injection well.

The flame front may also be propagated through the ore body from the recovery wells toward the injection wells by injecting a sufficient combustible mixture through the injection wells to impregnate the ore body. The combustible mixture is then ignited in the recovery wells, as by means of a heater 16 as shown in Figure 2, whereby the combustible mixture will burn from the recovery wells toward the injection wells. A lower rate of injection of the combustible mixture may be continued through the injection wells during the burn-back type of operation to assure continued combustion in the ore body. This last-mentioned method will be particularly useful in ore bodies having a low permeability, such that the rate of injection or passage of gaseous fluids through the ore body is insufficient to provide a forward propagation of the flame front.

Upon completion of the roast of the ore body 14 by the use of a combustible gas mixture as described above, or when the roast has proceeded to the desired extent, a suitable solvent solution is injected through each of the injection wells in the manner previously described to leach the soluble minerals from the ore body 14. The combustion of the gas mixture in the ore body will facilitate the action of a solvent on the uranium retained in the ore body and will convert the vanadium content of the ore body to a soluble form. Also, an increase in the permeability of the ore body is obtained to generally facilitate the subsequent leaching operation.

The present invention is not limited to any specific array or arrangement of injection and recovery wells. For example, we may use the familiar five-spot or seven-spot well plans commonly used in the in situ combustion of petroleum reservoirs. The configuration and permeability of the ore body will determine the most desirable well arrangement. The injection and recovery wells are formed in such an arrangement that the greatest area or volume of the ore body may be subjected to the roasting and leaching steps. For example, in a highly permeable ore body a few rows of wells may be sufficient to provide reasonable pressure drops during air injection and subsequent leaching operations in the manner described above. When using rows of wells, the distance between wells in a row should be less than the distance between rows in order to reduce the pressure drop, which ordinarily occurs in the immediate vicinity of injection and recovery wells.

From the foregoing it will be apparent that the pressure invention provides an economical process for recovering minerals such as uranium, vanadium, and radium from an ore body, and such recovery is made without the necessity of removing the ore from its position in the earth. In other words, we eliminate the time-consuming and expensive operation of physically mining uranium-containing ores as well as grinding or crushing of ores. We provide a novel method of recovering uranium and the like by extraction and provide a method enhancing the recovery of vanadium from an ore containing little or no carbonaceous material.

Other modes of applying the principle of the invention may be employed, change being made in regard to the details described, provided the features stated in any of the following claims, or the equivalent of such, are employed.

What is claimed is:

1. A method of recovering soluble minerals from a subsurface mineral bearing ore body, comprising the steps of:

(a) forming at least two spaced wells into the ore body,
(b) injecting a carbon containing material into the ore body from one of the wells,
(c) burning said carbon containing material in situ in the ore body,
(d) forcing a solvent through the ore body from said one well to the other of said wells to leach minerals from the ore body, and
(e) recovering the pregnant solvent through said other wells.

2. A method as defined in claim 1 characterized further in that an oxygen containing gas is injected through one well with the solvent to further oxidize materials in the ore body for solubilization by the solvent.

3. A method as defined in claim 1 characterized further in that the solvent is an aqueous carbonate solution.

4. A method as defined in claim 1 characterized further in that the solvent is an aqueous acidic solution having a pH of from 0.1 to 1.5.

5. A method as defined in claim 1 characterized further in that said carbon containing material is a gaseous hydrocarbon and is injected into the ore body with sufficient oxygen containing gas to sustain burning of the hydrocarbon in the ore body.

6. A method as defined in claim 1 characterized further in that the carbon containing material is a liquid hydrocarbon.

7. A method as defined in claim 6 characterized further in that sufficient liquid hydrocarbon is injected into the ore body to provide about 1.5 percent carbon deposit in the ore body.

8. A method as defined in claim 6 characterized further in:

(a) heating the ore body adjacent said one well to the combustion temperature of the liquid hydrocarbon, then
(b) forcing an oxygen containing gas into the ore body through said one well to form a flame front in the ore body adjacent said one well, and driving the flame front toward said other wells to burn the liquid hydrocarbon in the ore body.

9. A method as defined in claim 8 characterized further in that the flame front is forced substantially to said other wells prior to introduction of solvent into the ore body through said one well.

10. A method as defined in claim 8 characterized further in that the oxygen containing gas is injected at a rate sufficient to provide at least 1 s.c.f. of oxygen per hour per square foot of area of the ore body at the flame front normal to the direction of advance of the flame front.

11. A method as defined in claim 8 characterized further in that the oxygen containing gas is substantially pure oxygen and is injected at a rate of at least 1 s.c.f. per hour per square foot of area at the flame front normal to the direction of advance of the flame front.

12. A method as defined in claim 8 characterized further in that said oxygen containing gas is air, and the air is injected at a rate of at least 4 s.c.f. per hour per square foot of area of the ore body at the flame front normal to the direction of advance of the flame front.

References Cited in the file of this patent

UNITED STATES PATENTS

| | | |
|---|---|---|
| 1,577,411 | Thews | Mar. 16, 1926 |
| 1,960,932 | Tracy | May 29, 1934 |
| 2,617,719 | Stewart | Nov. 11, 1952 |
| 2,630,037 | Martin | Mar. 3, 1953 |
| 2,771,140 | Barclay et al. | Nov. 20, 1956 |
| 2,780,449 | Fisher et al. | Feb. 5, 1957 |
| 2,795,279 | Sarapun | June 11, 1957 |
| 2,818,240 | Livingston | Dec. 31, 1957 |

OTHER REFERENCES

Engineering and Mining Journal, Sept. 1954, vol. 155, No. 9, pages 104–109, 23–14.5a.